United States Patent
Matsumoto et al.

(10) Patent No.: US 6,795,642 B2
(45) Date of Patent: Sep. 21, 2004

(54) VIDEO RECORDING APPARATUS AND MONITORING APPARATUS

(75) Inventors: Kazuya Matsumoto, Tokyo (JP);
Kazuhisa Tsuzuki, Fort Lee, NJ (US);
Megumi Umezawa, Kanagawa (JP);
Manabu Nakamura, Kanagawa (JP);
Mamoru Higashimura, Kanagawa (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 0 days.

(21) Appl. No.: 09/918,172

(22) Filed: Jul. 30, 2001

(65) Prior Publication Data

US 2002/0015582 A1 Feb. 7, 2002

(30) Foreign Application Priority Data

Jul. 31, 2000 (JP) .................................... P. 2000-231566

(51) Int. Cl.[7] ................................................ H04N 7/26
(52) U.S. Cl. ........................ 386/109; 386/109; 348/143; 348/153
(58) Field of Search .............................. 386/46, 95, 52, 386/55, 109, 111; 348/143, 152, 154, 155, 153

(56) References Cited

U.S. PATENT DOCUMENTS 5,689,442 A * 11/1997 Swanson et al. ............ 380/241
5,724,475 A * 3/1998 Kirsten ........................ 386/109
5,862,342 A * 1/1999 Winter et al. ............... 709/231
5,982,418 A * 11/1999 Ely et al. ..................... 348/153
6,226,447 B1 * 5/2001 Sasaki et al. ................ 386/112

FOREIGN PATENT DOCUMENTS

| JP | 9322154 | 12/1997 |
| JP | 10228729 | 8/1998 |
| JP | 11069298 | 3/1999 |
| JP | 11308570 | 11/1999 |
| JP | 2000-13744 | 1/2000 |

* cited by examiner

*Primary Examiner*—Vincent Boccio
*Assistant Examiner*—James A Fletcher
(74) *Attorney, Agent, or Firm*—Pearne & Gordon LLP

(57) ABSTRACT

When a video input (image data) sequentially fetched from a monitor camera is to be stored in data storage means, frame rate calculating means calculates a frame rate for storage of the image data by using a picture recording time mode, a residual capacity of the data storage means, the presence of generation of an alarm signal and a value of a picture quality parameter for data compression. The frame rate calculating means thins a video signal which does not correspond to the frame rate so as not to be stored in the data storage means. Consequently, image data for a predetermined time are stored in the data storage means.

5 Claims, 2 Drawing Sheets

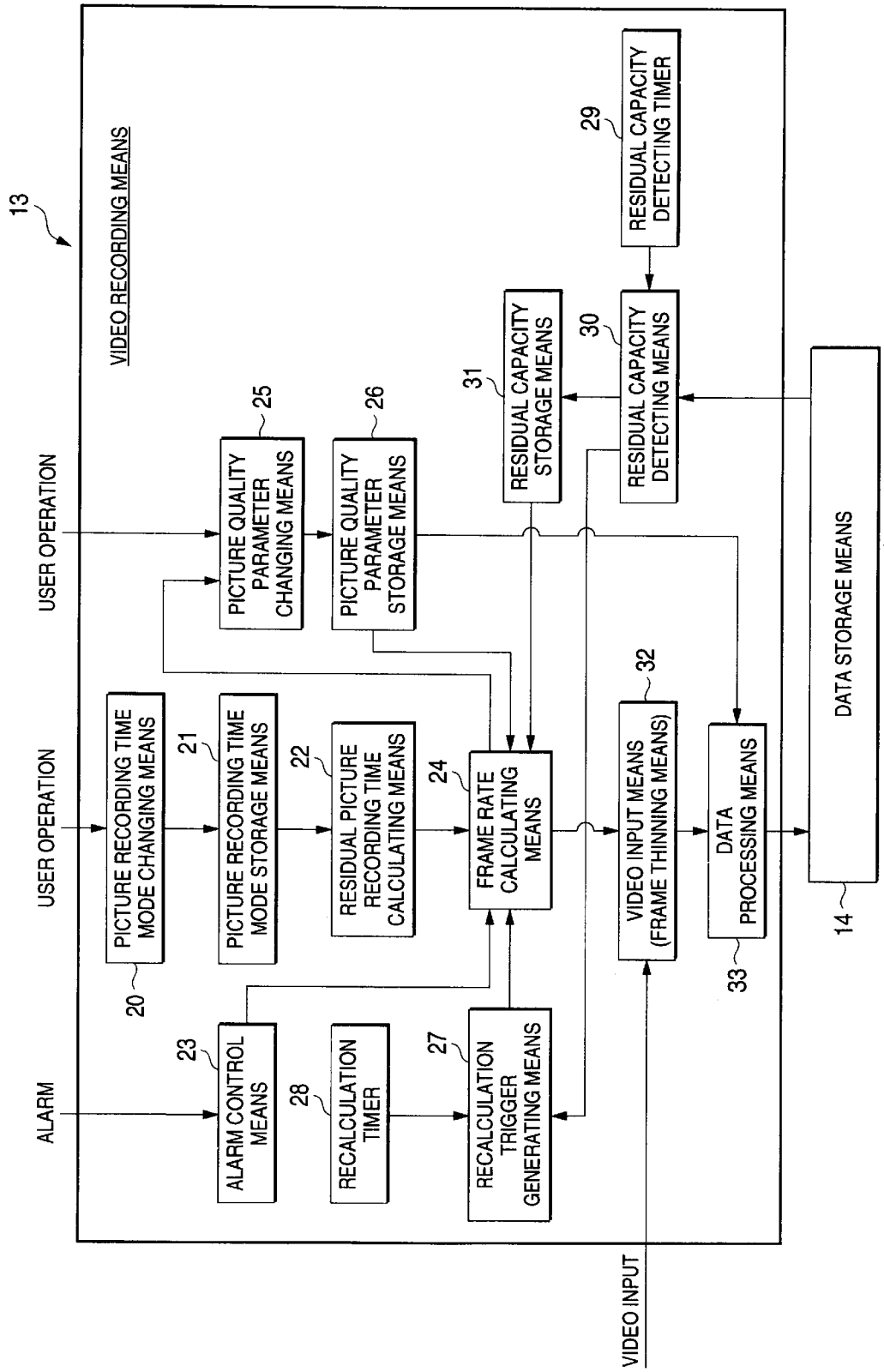

VIDEO RECORDING APPARATUS AND MONITORING APPARATUS

BACKGROUND OF THE INVENTION

1. Field of the Invention

The present invention relates to a video recording apparatus for recording a static image in digital data, and more particularly to a video recording apparatus for compressing a fetched static image into data and recording the data in a random accessible digital data storage medium such as a hard disk or a magneto-optic disk and a monitoring apparatus using the video recording apparatus.

2. Description of the Related Art

A monitoring apparatus installed in a station, a bank or various stores usually records an analog video fetched from the monitor camera in a video tape. In recent years, however, a computer technology has been developed and a storage medium having a large capacity such as a hard disk, a CD-R, an MD or a DVD which can store a large volume of digital data can be provided inexpensively. Thus, a monitoring apparatus for recording a digital image fetched from image pick-up means such as the monitor camera in a digital data storage medium such as a hard disk has spread.

In the case in which a static image is to be fetched at a frame rate of one frame per second, for example, from a monitor camera installed in each of a plurality of monitoring places and is to be stored in a hard disk, even a hard disk having a large capacity is filled with monitoring data in a short time if the static image is stored as bit map data. Consequently, it is impossible to store, in the hard disk, monitoring data for a necessary monitoring time such as past 24 hours or the past week. For this reason, the static image is compressed into data and the data are stored, in the hard disk, as image data such as a JPEG (Joint Photographic Experts Group) or a GIF (Graphic Interchange Format).

In the case in which the static image fetched from the monitor camera is to be compressed into data, a data compression rate to be one of picture quality parameters in the same image is changed so that the capacity of one image data is varied and the number of image data which can be stored in a hard disk having a fixed capacity is also varied. Furthermore, the capacity of one image data greatly fluctuates with a variation in the contents of an image. For this reason, there is generated such a situation that image data for a predetermined monitoring time cannot be stored in the hard disk having a certain fixed capacity. Consequently, there is also supposed such a situation that monitoring data cannot be recorded during the generation of an accident because the hard disk is filled.

SUMMARY OF THE INVENTION

It is an object of the invention to provide a video recording apparatus capable of storing monitoring data for a predetermined monitoring time in a digital data storage medium and a monitoring apparatus using the video recording apparatus.

The object can be achieved by a video recording apparatus for storing image data sequentially fetched from image pick-up means in a digital data storage medium at a predetermined frame rate, comprising frame rate calculating means for calculating the frame rate depending on a picture recording time of the image data into the digital data storage medium.

The object can be achieved by a video recording apparatus for storing image data sequentially fetched from image pick-up means in a digital data storage medium at a predetermined frame rate, comprising frame rate calculating means for calculating the frame rate depending on a residual capacity of the digital data storage medium.

It is preferable that the frame rate calculating means should calculate a frame rate by setting image data for a past predetermined time of image data fetched from the image pick-up means to be a value which can be stored in the digital data storage medium. Furthermore, the frame rate calculating means calculates a frame rate based on a value of a picture quality parameter when image data are to be compressed and stored in the digital data storage medium. When the calculated frame rate is equal to or lower than a predetermined value, moreover, the frame rate is fixed to the predetermined value to regulate the value of the picture quality parameter. In addition, the frame rate calculating means reads a value of a prepared table to calculate a frame rate in place of the computation, and furthermore, sets image data having a high degree of importance to have a fixed frame rate and image data having a low degree of importance to have a lower frame rate when the frame rate is equal to or lower than a predetermined value.

It is more preferable that there should be provided data processing means for setting a data compression rate of image data having a high degree of importance to be lower than a data compression rate of image data having a low degree of importance, thereby storing the data in the digital data storage medium. Moreover, image data are set to have a high degree of importance when an alarm is generated or a trigger input is manually carried out. Furthermore, the data processing means deletes the image data having a low degree of importance or overwrites new image data having a high degree of importance to the image data having a low degree of importance when a residual capacity of the digital data storage medium is equal to or smaller than a predetermined capacity, and the degree of importance of image data is decided based on a value of a flag added to the image data.

It is more preferable that the data processing means should store only image data having a high degree of importance in the digital data storage medium when a residual capacity of the digital data storage medium is equal to or smaller than a predetermined capacity. At this time, moreover, a storage region for storing only image data having a high degree of importance is preset to be a dedicated region for each type of an alarm.

The object can be achieved by a monitoring apparatus comprising a monitor camera, an alarm generating device, the video recording apparatus having any of the structures described above which serves to input image data fetched from the monitor camera and an alarm fetched from the alarm generating device, and a monitor device for displaying, on a screen, the image data or image data obtained by reproducing image data stored in the digital data storage medium of the video recording apparatus.

Thus, in the case in which the image data sequentially input are to be stored in the digital data storage medium, a frame rate for storage is dynamically changed according to a picture recording time or the residual capacity of the storage medium so that image data for a predetermined time can be stored in the storage medium. Consequently, the picture recording time can be maintained. At this time, if a priority is given to image data having a high degree of importance and the image data are stored with a high picture quality, the limited storage medium capacity can be utilized effectively and an important image can be stored with a high density.

BRIEF DESCRIPTION OF THE DRAWINGS

FIG. 3 is a detailed block diagram showing the structure of video recording means illustrated in FIG. 2.

DETAILED DESCRIPTION OF THE PREFERRED EMBODIMENTS

Embodiments of the invention will be described below with reference to the drawings.

Figure 1:
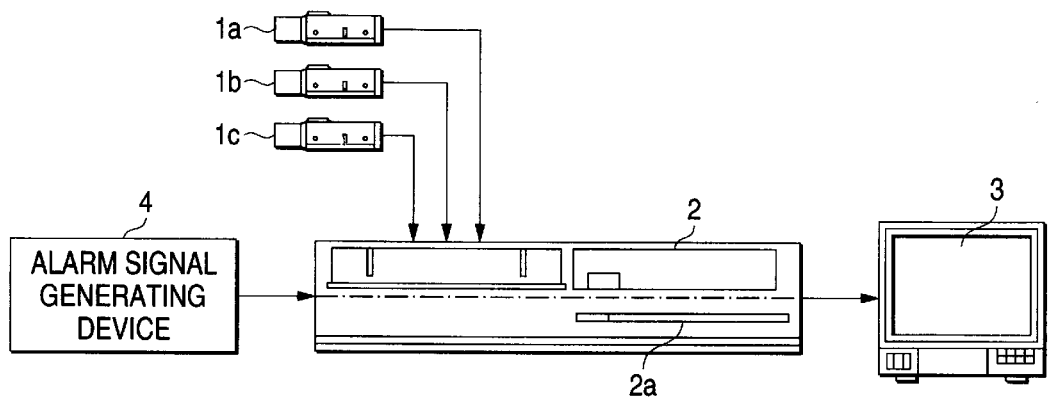
FIG. 1 is a diagram showing the structure of a monitoring apparatus using a video recording apparatus according to an embodiment of the invention.

FIG. 1 is a diagram showing the structure of a monitoring apparatus according to the embodiment of the invention. The monitoring apparatus comprises a plurality of image pick-up means (hereinafter referred to as monitor cameras) 1a, 1b, 1c, . . . provided in a plurality of places respectively, a video recording apparatus 2 for fetching a video signal sent from each of the monitor cameras 1a, 1b, 1c, . . . , a monitor device 3 for displaying the video signal on a screen and for displaying, on the screen, a video obtained by reproducing image data stored in data storage means such as a hard disk in the video recording apparatus 2, and an alarm signal generating device 4 for sending an alarm signal to the video recording apparatus 2. A plurality of alarm signal generating devices 4 (hereinafter referred to as sensors) are also provided corresponding to the monitoring places and, for example, detect the opening and closing operation of a door or a window or presence of movement, thereby sending an alarm signal to the video recording apparatus 2.

The video recording apparatus 2 sequentially fetches an image picked up by each of the monitor cameras 1a, 1b, 1c, . . . (a video signal) and compresses the image into data to be stored in the data storage means. At this time, a frame rate at which image data are to be stored is variable according to a time required for picture recording in the data storage means. For example, moreover, the image picked up by the monitor camera 1a installed in a place having a high degree of monitoring importance is set to be more often fetched than the image picked up by the monitor camera 1c installed in a place having a low degree of monitoring importance and to be stored in the data storage means.

Moreover, since the degree of monitoring importance is high during day having many visitors, the frame rate is increased to set one frame per second, for example, and the video signal sent from the monitor camera 1 is stored in the data storage means. When the degree of monitoring importance is low at night after the door is closed, the frame rate is reduced to set one frame per minute and the video signal is stored in the data storage means. Furthermore, since the degree of monitoring importance is low when the alarm signal is not generated, the video signal is stored in the data storage means at a low frame rate. When the door is opened at night so that the alarm signal is generated, the degree of monitoring importance is increased. Therefore, the frame rate for the storage in the data storage means is increased. Furthermore, in the case in which the degree of monitoring importance is varied depending on the type of the alarm signal, the frame rate is varied depending on the type of the alarm. The data compression rate of an image having a high degree of monitoring importance is reduced to enhance a picture quality, and the data compression rate of an image having a low degree of monitoring importance is increased to reduce the picture quality.

In the embodiment, thus, a monitoring interval, that is, a frame rate is dynamically changed and a data compression rate to be one of picture quality parameters is dynamically changed depending on a picture recording time and a degree of monitoring importance. On the other hand, it is necessary to store monitoring data for a predetermined monitoring time in data storage means having a fixed capacity. In the embodiment, therefore, the frame rate is dynamically varied depending on the residual capacity of the data storage means, and furthermore, the data compression rate is also varied if necessary as will be described below. Moreover, when the data storage means has no residual capacity and an image having a high degree of monitoring importance is fetched, image data having a low degree of monitoring importance which are stored in the data storage means are identified through a flag attached every image data, for example, and are deleted or overwritten. Thus, image data having a high degree of monitoring importance are stored in the data storage means.

Not to mention, the picture recording time and the residual capacity are based on a quantity of image data recorded in the data storage means. Therefore, any kinds of parameters based on the quantity of the recorded image data are applicable for setting the frame rate.

Figure 2:
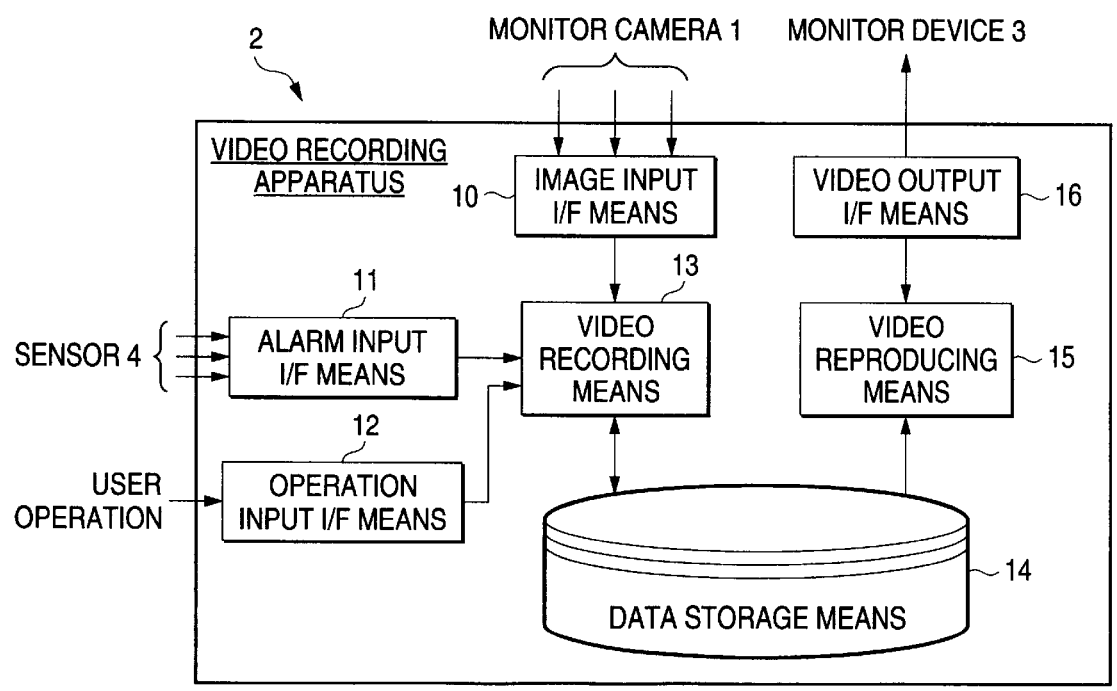
FIG. 2 is a block diagram showing the structure of the video recording apparatus illustrated in FIG. 1.

FIG. 2 is a detailed block diagram showing the structure of the video recording apparatus 2 illustrated in FIG. 1. The video recording apparatus 2 comprises video input interface (IF) means 10 for fetching a video signal sent from a monitor camera 1, alarm input interface (IF) means 11 for fetching an alarm signal sent from a sensor 4, operation input interface (IF) means 12 for fetching an input signal through a manual input button 2a (FIG. 1) provided on a panel of the video recording apparatus 2, video recording means 13 for fetching a signal from the IF input means 10, 11 and 12 and executing an arithmetic processing as will be described below in detail, data storage means 14 for storing compressed digital image data, video reproducing means 15 for reading the image data stored in the data storage means 14 and reproducing a video signal, and video output interface (IF) means 16 for outputting the video signal reproduced by the means 15 to a monitor device 3.

FIG. 3 is a detailed block diagram showing the structure of the video recording means 13 illustrated in FIG. 2. The video recording means 13 according to the embodiment includes picture recording time mode changing means 20 for receiving a user operation input and changing a picture recording time (monitoring time) mode, and picture recording time mode storage means 21 for storing the picture recording time mode which is being operated and for changing the stored contents upon receipt of the output of the means 20.

The picture recording time mode is the same as a standard mode/triple mode to be conventionally used in a video tape (VTR), and includes a standard mode in which image data for a predetermined monitoring time are stored in the data storage means 14, and a plurality of long time modes in which image data for a monitoring time which is predetermined times as long as the monitoring time of the standard mode (a mode in which a basic frame rate is set to 1/x (x is a predetermined number) of the standard mode, thereby storing image data having a capacity which is predetermined times as large as the capacity in the standard mode), one of which can be selected by a user.

The video recording means 13 further includes residual picture recording time calculating means 22 for calculating a residual time required for picture recording in a picture recording time mode specified by the user, alarm control means 23 for receiving an alarm signal output from the sensor 4 through the IF input means 11 (FIG. 1), frame rate calculating means 24 which will be described below in detail, picture quality parameter changing means 25 for changing a picture quality parameter based on a result of the calculation of the means 24 or user specification, and picture quality parameter storage means 26 for storing a current picture quality parameter and changing the stored contents upon receipt of the output of the means 25.

The video recording means 13 further includes recalculation trigger generating means 27 for applying a recalculation trigger for frame rate calculation to the frame rate calculating means 24, a timer 28 for interrupting the means 27, a residual capacity timer 29 for applying a trigger to detect the residual capacity of the data storage means 14, residual capacity detecting means 28 for detecting the residual capacity of the data storage means 14 and applying a recalculation trigger to the recalculation trigger generating means 27 upon receipt of a trigger signal from the timer 29, and residual capacity storage means 31 for storing the residual capacity detected by the means 28. The timer 28 and the timer 29 can also be shared.

Furthermore, the video recording means 13 includes video input means 32 for fetching a video signal input from the monitor camera 1, deciding whether or not the video signal is to be recorded based on an instruction sent from the frame rate calculating means 24 and outputting the video signal (image data) if the video signal is to be recorded (that is, image data which do not correspond to the frame rate calculated by the means 24 are not output and the image data are thinned so as not to be recorded in the storage means 14), and data processing means 33 for fetching the image data output from the means 32, compressing the image data based on a data compression rate in the picture quality parameter stored in the picture quality parameter storage means 26, and recording the compressed image data in the data storage means 14. A value indicative of a degree of monitoring importance of the image data is added as a flag value to the image data to be recorded in the data storage means 14 by the data processing means 33.

Based on the residual picture recording time calculated by the residual picture recording time calculating means 22, the residual capacity of the data storage means 14 which is fetched from the residual capacity storage means 31 and a value of a picture quality parameter fetched from the picture quality parameter storage means 26, the frame rate calculating means 24 recalculates a frame rate every time it receives a trigger signal for recalculation from the recalculation trigger generating means 27. Moreover, the result of the recalculation is changed upon receipt of an alarm signal. Thus, the recalculated or changed frame rate is output to the video input means 32 and the parameter changing means 25 is fed back when the value of the picture quality parameter is to be changed based on the calculated frame rate.

When the frame rate calculating means 24 repeats the recalculation of the frame rate as described above, the frame rate becomes equal to or lower than a predetermined frame rate depending on the residual capacity of the data storage means 14. If the frame rate is too low, the role of monitoring is not filled. In the embodiment, therefore, when the frame rate is equal to or lower than the predetermined frame rate as a result of the recalculation, the frame rate is fixed to the predetermined frame rate, and the picture quality parameter is then adjusted to lower a picture quality level.

Moreover, when the calculated frame rate is equal to or lower than the predetermined frame rate, image data having a high degree of importance may be recorded at the predetermined frame rate and an image having a low degree of importance may be recorded at a frame rate which is much lower than the calculated frame rate. Thus, it is possible to maintain the frame rate of a picture quality having a high degree of importance without deteriorating the picture quality for each frame.

Next, the operation of the monitoring apparatus having the structure described above will be described.

In the case in which the video recording apparatus 2 starts an operation in such a state that any image data are not stored in the data storage means 14, a monitoring image fetched from each of the monitor cameras $1a$, $1b$, ... is stored in the data storage means 14 based on a frame rate and a data compression rate which are previously set for each degree of monitoring importance corresponding to a specified picture recording time mode. The frame rate and the data compression rate which are preset to be default values are determined to have such values that data for a predetermined monitoring time can be stored in the data storage means 14 based on a mean file capacity of monitoring image data or a mean alarm generating frequency. In the case in which the removable data storage means 14 is to be used, the storage capacity of the data storage means 14 may be read to calculate the frame rate and the picture quality parameter at each time based on the picture recording time mode.

When the monitoring image data are gradually stored in the data storage means 14, the frame rate calculating means 24 repeats the recalculation of a frame rate for each monitor camera or a data compression rate for each degree of monitoring importance based on the residual capacity of the data storage means 14, the mean capacity of the stored image data and a residual time required till a predetermined monitoring time, and outputs a control instruction to the video input means 32 and the picture quality parameter changing means 25 such that monitoring image data for a predetermined monitoring time can be stored in the data storage means 14.

In the case in which an alarm signal is generated in such a state that the residual capacity of the data storage means 14 is reduced, the monitoring image data having a high degree of monitoring importance are to be stored in the data storage means 14. In the embodiment, therefore, in the case in which such a situation is caused, the monitoring image data having a low degree of monitoring importance which are stored in the data storage means 14 are identified based on the value of a flag added to the same image data, the image data having a low degree of monitoring importance are deleted to increase the residual capacity or the monitoring image data having a high degree of monitoring importance are overwritten to the image data having a low degree of monitoring importance.

In the case in which the monitoring image data for a predetermined monitoring time are thus stored in the data storage means 14, the above-mentioned operation is repeated by replacing the removable data storage means 14 with new data storage means. In this case, if the capacity of the newly inserted data storage means 14 is different from that of the last data storage means 14, the video recording apparatus 2 reads the capacity, thereby setting a frame rate and a picture quality parameter at which the monitoring image data for the predetermined monitoring time can be stored in the data storage means 14.

In the case in which it is premised that the data storage means 14 is fixed and is not replaced, the stored data which are old in the past, that is, by the predetermined monitoring time from a current time are deleted or overwritten when new monitoring image data are fetched from the monitor camera. Consequently, monitoring image data for a past predetermined monitoring time are always stored in the data storage means 14. In this case, the data storage means 14 is always set in a full state. Therefore, the capacity for the old stored data which can be deleted is regarded as a residual capacity so that the same operation as described above is carried out.

While the new monitoring image data having a high degree of importance are overwritten to the stored data having a low degree of importance when the residual capacity is reduced in the embodiment, only the monitoring image data having a high degree of importance can also be stored in the data storage means 14 when the residual capacity becomes constant. In this case, it is preferable that a storage region dedicated for each alarm should be assigned according to the type of an alarm and the monitoring image data should be stored in the corresponding dedicated region for each type of the alarm.

While the case in which the video recording apparatus 2 automatically stores the monitoring image data in the data storage means 14 has been described in the embodiment, it is also possible to provide such a structure that an operator for monitoring the monitor device 3 manually inputs a picture recording trigger signal to record the same monitoring image data as monitoring image data having a high degree of importance in the data storage means 14 in the middle of the automatic operation of the video recording apparatus 2. Moreover, the data processing means 33 can also have the function of recompressing the stored data depending on a degree of importance and increasing the residual capacity in a spare time when the residual capacity is reduced.

According to the embodiment described above, it is possible to ensure the picture quality of the important monitoring image data while maintaining a picture recording time for a predetermined monitoring time, and furthermore, to reliably record the monitoring image data when an alarm is generated. Thus, it is possible to record the monitoring image data having a high degree of importance as much as possible.

In the embodiment described above, a part or all of the calculating process of the frame rate calculating means 24 may be carried out based on a prepared table such that a numeric value or a frame rate in the calculating process is guided to a value such as a residual recording time, a residual capacity or a picture quality parameter. With such a structure, a complexity can be reduced and a calculating speed can be increased.

According to the invention, a frame rate at which image data are to be recorded in a digital data storage medium is calculated depending on a recording time or a residual capacity. Therefore, it is possible to provide a video recording apparatus capable of storing image data for a predetermined time in the digital data storage medium even if image data having various capacities for recording are sequentially input.

While only certain embodiments of the invention have been specifically described herein, it will be apparent that numerous modifications may be made thereto without departing from the spirit and scope of the invention.

What is claimed is:

1. A video recording apparatus comprising:

a digital data storage medium;

compression means for compressing image data based on a degree of importance of the image data, wherein a value of a picture quality parameter is associated with said compressing;

frame rate calculating means for calculating a frame rate depending on said value of said picture quality parameter; and data processing means for deleting image data having a low degree of importance when a residual capacity of said digital data storage medium is equal to or smaller than a predetermined capacity, wherein, when the calculated frame rate is equal to or lower than a predetermined value, the frame rate is set to the predetermined value.

2. The video recording apparatus of claim 1, wherein said frame rate calculating means calculates said frame rate also depending on a residual value of said digital storage medium storage capacity.

3. A video recording apparatus comprising:

a digital storage medium;

a data processing means for deciding a degree of importance of image data and for deleting image data having a low degree of importance when a residual capacity of said digital data storage medium is equal to or smaller than a predetermined capacity; and frame rate calculating means for calculating a frame rate depending on all of a quantity of image data already recorded in said digital data storage medium, a picture quality parameter based on the importance of said image data, and a quantity of image data to be recorded in said digital data storage medium, wherein said resulting frame rate allows image data of high importance and of a predetermined time to be stored in said digital data storage medium at higher frame rates at higher picture quality at the expense of data of low importance which is stored at lower frame rates at a lower picture quality or deleted based on a quantity of image data recorded in said digital data storage medium.

4. The video recording apparatus of claim 3, wherein said data of low importance is recompressed by data processing means to increase said residual capacity for storing data of high importance.

5. A video recording apparatus comprising:

a digital data storage medium;

frame rate calculating means, wherein said frame rate calculating means calculates a frame rate depending on a quantity of image data recorded in said digital data storage medium; and a data processing means for further compressing image data having a low degree of importance to increase an amount of said residual capacity when either a residual capacity of said digital data storage medium is equal to or smaller than a predetermined capacity or a video image having a high degree of importance is to be stored.

* * * * *